(12) United States Patent
Tashiro et al.

(10) Patent No.: US 11,396,288 B2
(45) Date of Patent: Jul. 26, 2022

(54) PARKING ASSISTANCE DEVICE

(71) Applicant: HITACHI AUTOMOTIVE SYSTEMS, LTD., Hitachinaka (JP)

(72) Inventors: Naoyuki Tashiro, Tokyo (JP); Masashi Seimiya, Hitachinaka (JP); Masato Imai, Tokyo (JP); Shinya Kasai, Tokyo (JP)

(73) Assignee: HITACHI ASTEMO, LTD., Hitachinaka (JP)

(*) Notice: Subject to any disclaimer, the term of this patent is extended or adjusted under 35 U.S.C. 154(b) by 0 days.

(21) Appl. No.: 17/045,321

(22) PCT Filed: Mar. 20, 2019

(86) PCT No.: PCT/JP2019/011652
§ 371 (c)(1),
(2) Date: Oct. 5, 2020

(87) PCT Pub. No.: WO2019/193975
PCT Pub. Date: Oct. 10, 2019

(65) Prior Publication Data
US 2021/0354688 A1      Nov. 18, 2021

(30) Foreign Application Priority Data
Apr. 6, 2018    (JP) .............................. JP2018-074267

(51) Int. Cl.
*B60W 30/06*      (2006.01)
*B60W 30/14*      (2006.01)
(Continued)

(52) U.S. Cl.
CPC ............. *B60W 30/06* (2013.01); *B60K 35/00* (2013.01); *B60W 30/146* (2013.01);
(Continued)

(58) Field of Classification Search
CPC .. B60W 30/06; B60W 30/146; B60W 40/105; B60K 35/00; B60K 2370/166; G06K 9/00805
See application file for complete search history.

(56) References Cited

U.S. PATENT DOCUMENTS 6,102,147 A     8/2000   Shimizu
6,778,891 B2 *  8/2004   Tanaka ................. B62D 15/028
                                              180/204
(Continued)

FOREIGN PATENT DOCUMENTS

CA     3072034 A1 *  2/2019  ............ B60W 30/09
CN   108149990 A  *  6/2018  ............ E04H 6/426
(Continued)

OTHER PUBLICATIONS

International Search Report with English translation and Written Opinion issued in corresponding application No. PCT/JP2019/011652 dated May 28, 2019.

*Primary Examiner* — Chico A Foxx
(74) *Attorney, Agent, or Firm* — Foley & Lardner LLP

(57) ABSTRACT

In the invention, in automatic parking, a route from a parking start position to a target parking position is calculated prior to the start of parking. However, there are cases where an external environment recognition device cannot detect an obstacle at a distant or blind spot. In such a case, smooth parking is hindered when the vehicle is actually automatically parked. In the invention, in Step S1101, the vehicle is virtually moved from a parking start position 1201 in the direction of a turning position, and a turning position 1206 is calculated on a parking route 1205. In Step S1103, a preliminary route to a target parking position 1207 when the vehicle is turned back at the turning position 1206 is calculated. In the next Step S1104, it is determined whether the preliminary route can be generated, and when the
(Continued)

(a) BEFORE AUTOMATIC PARKING (b) DURING AUTOMATIC PARKING preliminary route satisfies a predetermined condition, the route calculated by a candidate route calculation unit 501 is adopted as an automatic parking route.

10 Claims, 20 Drawing Sheets

(51) Int. Cl.
  *B60W 40/105* (2012.01)
  *B60K 35/00* (2006.01)
  *G06K 9/00* (2022.01)
  *G06V 20/58* (2022.01)
(52) U.S. Cl.
  CPC ............ *B60W 40/105* (2013.01); *G06V 20/58* (2022.01); *B60K 2370/166* (2019.05)

(56) References Cited

U.S. PATENT DOCUMENTS

| | | | | |
|---|---|---|---|---|
| 10,562,525 | B2* | 2/2020 | Hasejima | G08G 1/16 |
| 2007/0198152 | A1* | 8/2007 | Endo | G08G 1/161 |
| | | | | 701/41 |
| 2011/0082613 | A1* | 4/2011 | Oetiker | B60W 10/20 |
| | | | | 701/25 |
| 2013/0120161 | A1* | 5/2013 | Wakabayashi | B62D 15/028 |
| | | | | 340/932.2 |
| 2014/0163862 | A1* | 6/2014 | Choi | G01C 21/26 |
| | | | | 701/400 |
| 2015/0353080 | A1* | 12/2015 | Mukaiyama | E05B 77/54 |
| | | | | 701/23 |
| 2015/0367845 | A1* | 12/2015 | Sannodo | B60W 30/08 |
| | | | | 701/23 |
| 2016/0001774 | A1* | 1/2016 | Nakada | B60W 30/06 |
| | | | | 701/22 |
| 2017/0015312 | A1* | 1/2017 | Latotzki | B60W 30/06 |
| 2017/0028984 | A1 | 2/2017 | Kiyokawa | |
| 2017/0129486 | A1* | 5/2017 | Nakada | B60W 10/20 |
| 2017/0259850 | A1* | 9/2017 | Yamashita | G08G 1/168 |
| 2018/0297589 | A1* | 10/2018 | Hasejima | B62D 15/028 |
| 2019/0027042 | A1* | 1/2019 | Fujishima | G05D 1/0225 |
| 2019/0071070 | A1* | 3/2019 | Kato | B60R 1/002 |
| 2019/0337506 | A1* | 11/2019 | Shima | B60W 30/06 |
| 2020/0249679 | A1* | 8/2020 | Hasejima | G01C 21/3407 |
| 2020/0369262 | A1* | 11/2020 | Suzuki | G06K 9/00798 |

FOREIGN PATENT DOCUMENTS

| | | | | |
|---|---|---|---|---|
| CN | 106945660 B | * | 9/2019 | ............ B60W 30/06 |
| JP | H10-287260 A | | 10/1998 | |
| JP | 2010018180 A | * | 1/2010 | |
| JP | 2016-84029 A | | 5/2016 | |
| JP | 2017-30567 A | | 2/2017 | |
| JP | 2017-52434 A | | 3/2017 | |
| JP | 2018-34541 A | | 3/2018 | |
| JP | 2018-36915 A | | 3/2018 | |

* cited by examiner (a) BEFORE AUTOMATIC PARKING  (b) DURING AUTOMATIC PARKING

PARKING ASSISTANCE DEVICE

TECHNICAL FIELD

The present invention relates to a parking assistance device.

BACKGROUND ART

There is a parking assistance device that automatically parks a vehicle at a target parking position by automatic steering. This parking assistance device recognizes the surrounding area of the vehicle by an external environment recognition device, geometrically calculates a route and a steering angle from a parking start position to the target parking position, and generates a parking route. The driver performs the automatic parking without steering operation. As such a parking assistance device, PTL 1 discloses a technique of performing more accurate parking assistance as the target parking position is approached.

CITATION LIST

Patent Literature

PTL 1: JP 2017-30567 A

SUMMARY OF INVENTION

Technical Problem

In a general automatic parking, a route from a parking start position to a target parking position is calculated prior to the start of parking. However, there are cases where an external environment recognition device cannot detect an obstacle at a distant or blind spot. In such a case, smooth parking is hindered when the vehicle is actually automatically parked.

Solution to Problem

A parking assistance device according to the invention includes a candidate route calculation unit that generates a candidate route from a current position of a vehicle to a target parking position based on a drivable area of the vehicle that is recognized based on external environment information, a turning position calculation unit that provides a turning position at a predetermined position on the candidate route generated by the candidate route calculation unit, and a preliminary route calculation unit that generates a preliminary route from the turning position to the target parking position. The candidate route in which the preliminary route can be generated by the preliminary route calculation unit is set to a parking route of automatic parking.

Advantageous Effects of Invention

According to the invention, it is possible to make automatic parking smoothly.

DESCRIPTION OF EMBODIMENTS

First Embodiment

Prior to the description of the embodiment, a general automatic parking will be described with reference to FIGS. 1 and 2.

Figure 1:
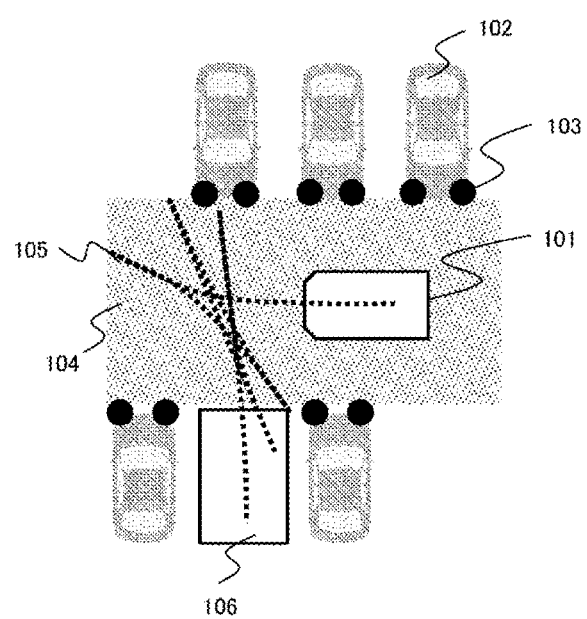
FIG. 1 is a diagram for explaining general automatic parking.
Figure 2:
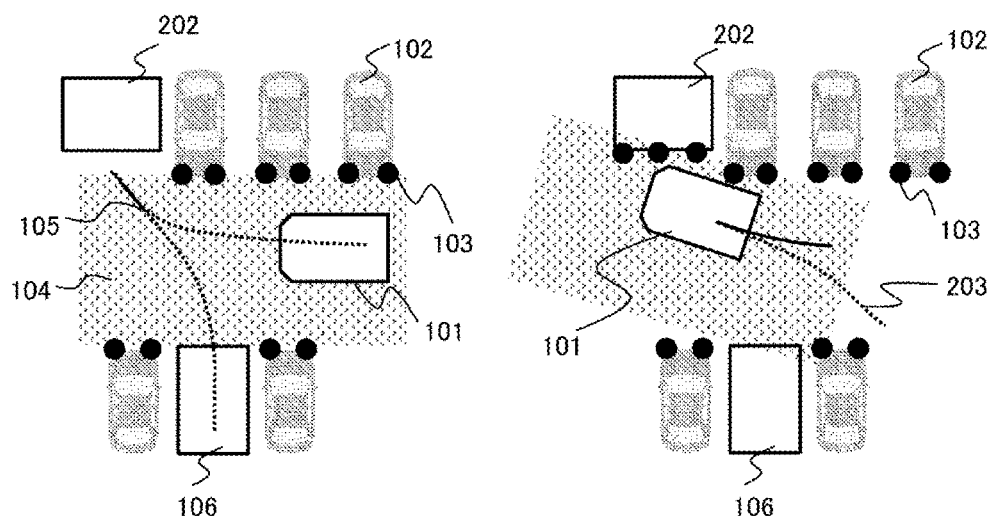
FIG. 2 is a diagram for explaining general automatic parking.

As illustrated in FIG. 1, based on an external environment recognition device such as a camera or an ultrasonic sensor installed in a vehicle 101, an area 104 (indicated by hatching in the diagram) in which the vehicle 101 can travel is calculated at a parking start position based on position information 103 of an obstacle 102 such as a parked vehicle. Next, a parking route 105 (dotted line) to a target parking position 106 is calculated based on the calculated drivable area 104. When the route search is successful, the movement control of the vehicle 101 is performed according to the parking route 105.

However, as illustrated in FIG. 2(a), the route may not be detected at the parking start position with respect to an obstacle 202 that is out of the area 104. In such a case, as illustrated in FIG. 2(b), when the vehicle 101 is moved to a point where the obstacle 202 can be detected, it is necessary to correct a parking route such as a turning route from that position. At that time, when the movable space of the vehicle 101 is narrow, the correction amount is limited, the vehicle cannot move backward in a large turn to avoid a collision, a correction route 203 is inflated, or parking is stalled. Therefore, parking is not made smoothly. In this embodiment, as described below, such a situation does not occur, and smooth parking is possible.

Figure 3:
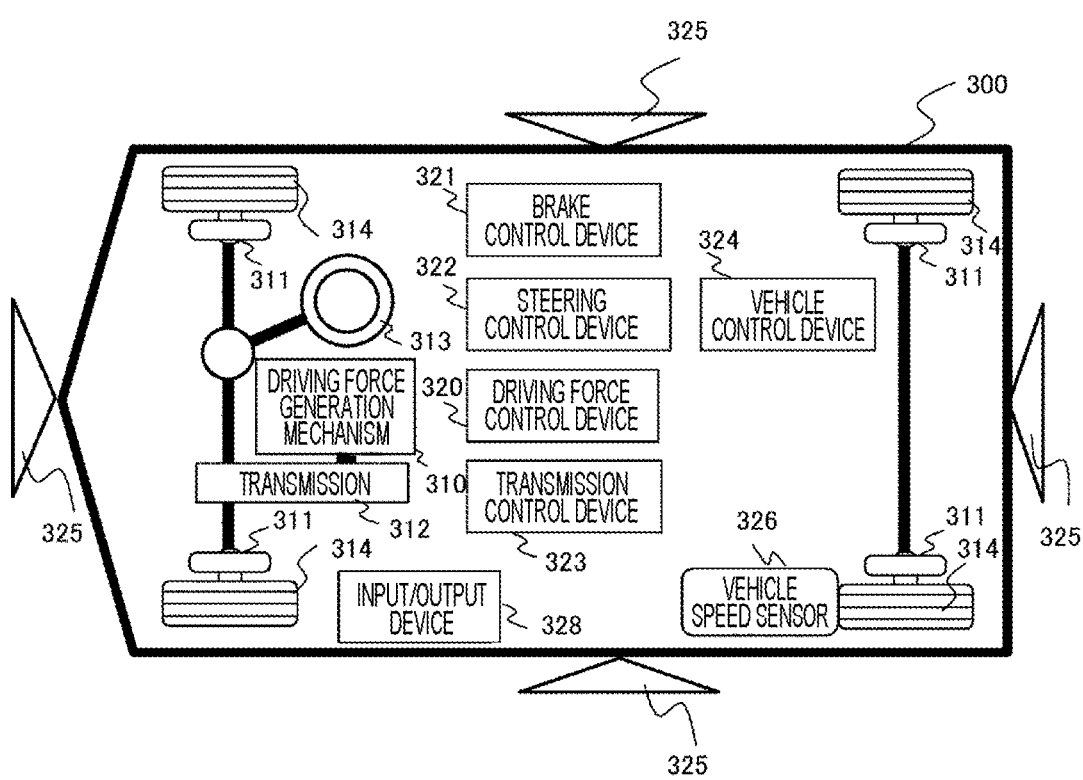
FIG. 3 is a diagram illustrating a configuration of a vehicle with a parking assistance device mounted thereon.

FIG. 3 is a diagram illustrating a configuration of a vehicle 300 with a parking assistance device according to an embodiment of the invention mounted.

The vehicle 300 includes a driving force generation mechanism 310 that is a power source, a brake 311 that brakes the vehicle 300, and a transmission 312 that has a gear for switching the driving force generated by the driving force generation mechanism 310 to move forward and backward. The driving force generated by the driving force generation mechanism 310 rotates left and right wheels 314 via the transmission 312, thereby causing the vehicle 300 to travel. Further, a braking force is generated and the vehicle 300 is decelerated by controlling the brake 311. Here, the driving force generation mechanism 310 may be an engine, a hybrid mechanism of an engine and a motor, or a motor alone.

The vehicle 300 is equipped with a steering 313. When the steering 313 is turned, the direction of the wheels 314 is changed, and the vehicle 300 turns.

A driving force control device 320 controls the driving force generated by the driving force generation mechanism 310. A brake control device 321 controls the brake 311 so that a predetermined braking force is generated. In the case of automatic parking, a steering control device 322 controls the steering 313 so that a predetermined wheel angle is obtained even if the driver does not operate the steering 313. A transmission control device 323 controls the transmission 312 to switch forward and backward movements of the vehicle 300. Further, the vehicle 300 is provided with an external environment recognition device 325 that acquires external environment information around the vehicle 300 and recognizes a drivable area of the vehicle 300 based on the external environment information, and a vehicle speed sensor 326 that acquires speed information of the vehicle 300. The external environment recognition device 325 is configured by cameras which are installed on the front and rear sides and the right and left side surfaces of the vehicle 300 to acquire, for example, captured images around the vehicle 300 as external environment information, and a sonar which acquires distance information to an obstacle around the vehicle 300 as external environment information.

Further, the vehicle speed sensor 326 that acquires the speed information of the vehicle 300 is not limited to wheel speed pulse information, and the speed information may be indirectly calculated using a resolver rotation speed sensor of the motor, a rotation speed sensor of the transmission 312, or the like.

A vehicle control device 324 transmits a command value to the driving force control device 320, the brake control device 321, the steering control device 322, and the transmission control device 323 based on the information of an external environment recognition device 325 and the vehicle speed sensor 326. Further, an input/output device 328 for inputting/outputting input information from the driver and output information to the driver is provided for the information related to the automatic parking. Specifically, the input information includes the determination of a parking position, the start of automatic parking, etc., and the output information includes a bird's-eye view that combines a parking frame, route information, a turning position, and an image of the surroundings of the vehicle during automatic parking.

Figure 4:
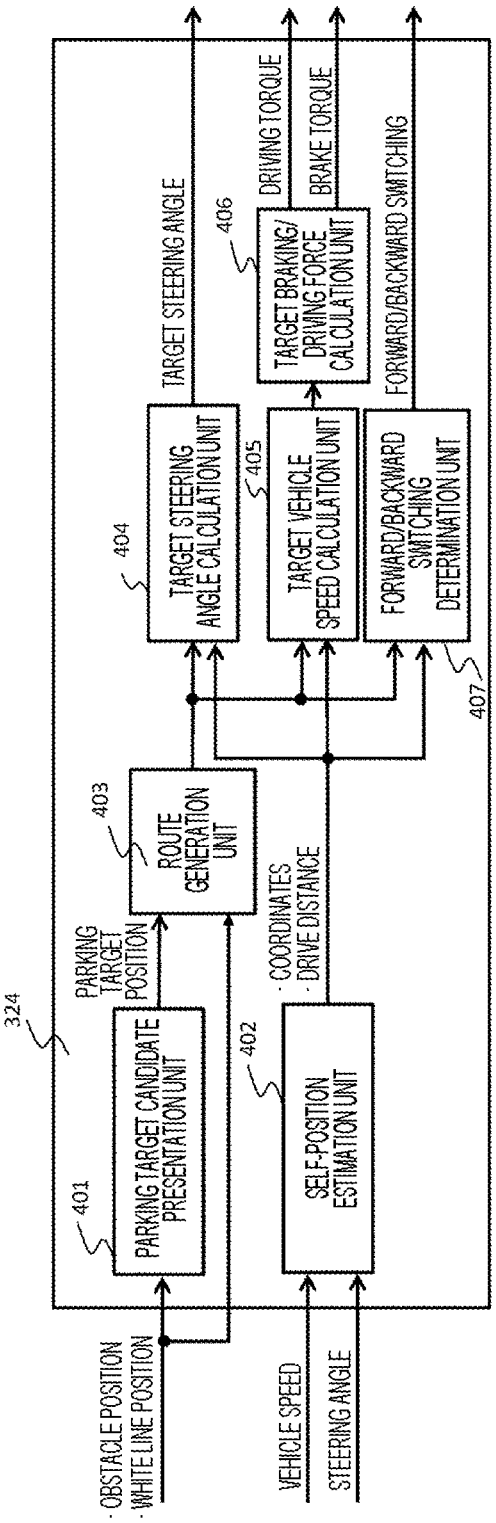
FIG. 4 is a block diagram illustrating a configuration of a vehicle control device.

Hereinafter, details of the vehicle control device 324 which is an application of the parking assistance device according to an embodiment of the invention will be described. FIG. 4 is a block diagram illustrating a configuration of the vehicle control device 324.

The vehicle control device 324 includes a parking target candidate presentation unit 401, a self-position estimation unit 402, a route generation unit 403, a target steering angle calculation unit 404, a target vehicle speed calculation unit 405, a target braking/driving force calculation unit 406, and a forward/backward switching determination unit 407.

The parking target candidate presentation unit 401 calculates a parking space based on the position of the obstacle, the position of the white line, and the like obtained from the external environment recognition device 325, and presents it to the driver as a parking target candidate. Specifically, the parking target candidate is displayed on a screen of a navigation system or the like of the input/output device 328, and the driver selects a parking target position to park from the parking target candidates.

When the automatic parking is started, the self-position estimation unit 402 calculates the self-position of the vehicle 300, specifically, the coordinates and the drive distance, and the like based on the vehicle speed information acquired from the vehicle speed sensor 326 and the steering angle information acquired from the steering 313.

The route generation unit 403 calculates a route that can be moved from the parking start position to the parking target position without hitting an obstacle or the like based on the parking target position and the position of the obstacle. When the route can be generated, the curvature information and the turning position with respect to the drive distance are output. Further, when it is determined that the height of the detected step is a height that can be overcome, it is not recognized as an obstacle, and when it is determined that the step cannot be overcome, it is recognized as an obstacle.

The target steering angle calculation unit 404 calculates a target steering angle based on the curvature information for the drive distance, which is the output result of the route generation unit 403, and transmits it to the steering control device 322. Here, the target steering angle is not limited to the output result of the route generation unit 403, and the target steering angle may be used in which the correction value of the steering amount when the relative relationship with the parking frame and the obstacle is deviated during the automatic parking.

The target vehicle speed calculation unit 405 determines a target vehicle speed in the actual drive control based on the magnitude of the curvature and the position of the obstacle, which are the output results of the route generation unit 403. At this time, when the target vehicle speed during drive control changes, smooth acceleration and deceleration are realized by correcting the target vehicle speed in consideration of an acceleration and also an acceleration increasing rate. Here, after the automatic parking is started, when the external environment recognition device 325 detects a step or a wheel clasp on the parking route, the target vehicle speed is reduced. As a result, the vehicle can be parked without giving an unpleasant shock to the driver at the time of a step or a wheel-clamping collision.

The target braking/driving force calculation unit 406 calculates the required braking/driving force based on the difference between the target vehicle speed and the vehicle speed information. At this time, when the braking force is generated, the braking torque is transmitted to the brake control device 321, and when the driving force is generated, the driving torque is transmitted to a driving force control device 120. Here, when the external environment recognition device 325 detects a slope, a step, or the like, the driving force corrected. Specifically, the driving force is corrected to increase when the slope is upward, and the driving force is corrected to decrease when the slope is downward. When a step is detected, the higher the step, the larger the driving force. As a result, the ability to follow the target vehicle speed can be improved.

The forward/backward switching determination unit 407 transmits the forward/backward switching to the transmission control device 323 based on the forward/backward switching information that the output result of the route generation unit 403.

Figure 5:
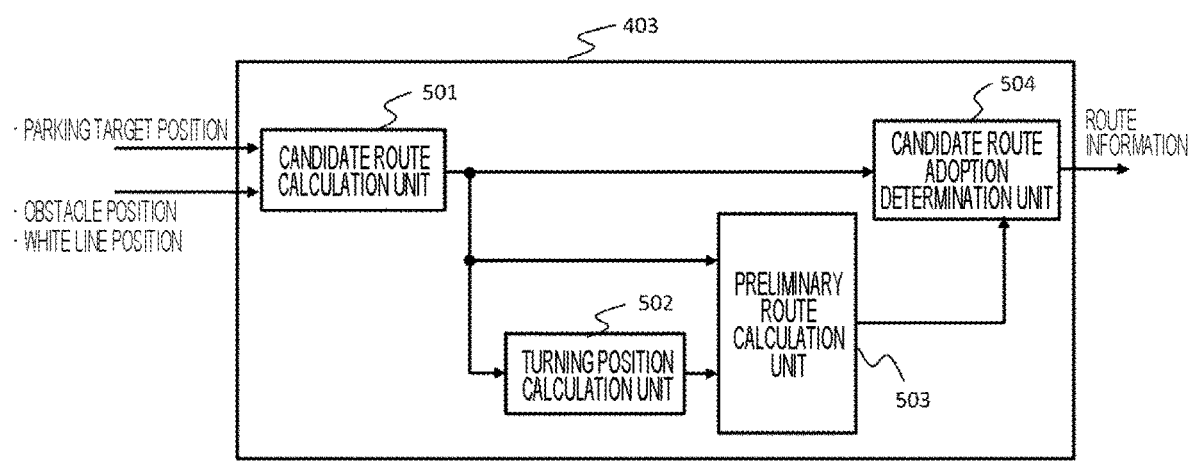
FIG. 5 is a block diagram illustrating a configuration of a route generation unit.

FIG. 5 is a block diagram illustrating a configuration of the route generation unit 403. As illustrated in FIG. 5, the route generation unit 403 includes a candidate route calculation unit 501, a turning position calculation unit 502, a preliminary route calculation unit 503, and a candidate route adoption determination unit 504.

The candidate route calculation unit 501 calculates a movable candidate route from the parking start position to the target parking position without colliding with the obstacle based on the position information of the obstacle recognized at the parking start position. A specific process of the candidate route calculation unit 501 will be described later with reference to FIG. 6.

As will be described later with reference to FIG. 11, the turning position calculation unit 502 sets the turning position at a predetermined position on the candidate route output by the candidate route calculation unit 501.

The preliminary route calculation unit 503 calculates a route (preliminary route) when the vehicle is turned back at the set turning position.

The candidate route adoption determination unit 504 determines whether the preliminary route can be generated and outputs either the candidate route or the preliminary route.

Figure 6:
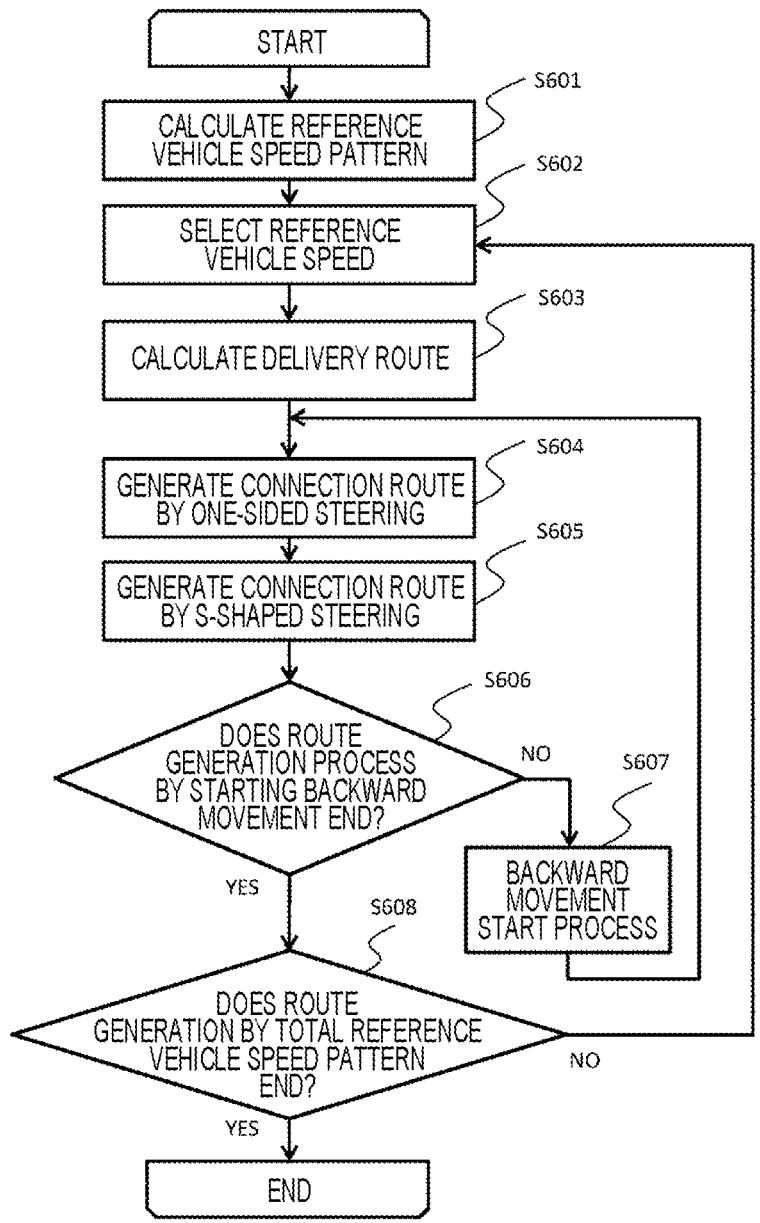
FIG. 6 is a flowchart illustrating a processing procedure of a candidate route calculation unit.

FIG. 6 is a flowchart of the candidate route calculation unit 501. Further, the program illustrated in this flowchart and the program illustrated in the flowchart described later can be executed by a computer including a CPU, a memory, and the like. The whole process or a part of the process may be realized by a hardware logic circuit. Further, this program can be stored in a storage medium of the vehicle control device 324 in advance and provided. Alternatively, the program may be stored and provided in an independent recording medium, or the program may be recorded and stored in the storage medium of the vehicle control device 324 through a network line. It may be provided as various forms of computer-readable computer program products such as data signals (carrier waves).

The processing procedure of the candidate route calculation unit 501 will be described with reference to FIG. 6.

In Step S601, reference vehicle speed pattern calculation is performed. First, a reference vehicle speed pattern Vbase for traveling on a route is calculated. Specifically, with reference to an upper limit vehicle speed Vmax with respect to the parking space, the vehicle speed is divided at predetermined intervals Vd, and the reference vehicle speed pattern Vbase is generated as illustrated in the following Expression (1).

[Math. 1]

$$V_{base}=[V_{max}, V_{max}-V_d, V_{max}-2V_d, \ldots ] \quad (1)$$

The upper limit of the speed set for the parking space is as follows in this embodiment. The upper limit vehicle speed Vmax is set smaller as a road width becomes narrower. Further, as the distance to the obstacle becomes shorter, the upper limit vehicle speed Vmax is set smaller. Specifically, the candidate route calculation unit 501 sets the reference vehicle speed smaller as the road width becomes narrower or as the distance to the obstacle becomes shorter. For example, if the road width is 10 m, the upper limit vehicle speed Vmax is set, and if it is 6 m, Vmax−2Vd is set. Alternatively, if the distance to the obstacle is 3 m, the upper limit vehicle speed Vmax is set, and if it is 0.5 m, Vmax−3Vd is set. As a result, the speed can be slowed down when the road is narrow or the distance to the obstacle is short, and the driver's fear can be alleviated.

Further, by setting the upper limit vehicle speed Vmax in the backward direction to be smaller than the forward direction, it is possible to slow down the backward speed, which is difficult for the driver to confirm, and to alleviate the driver's fear.

Further, even with the same curvature, the lateral acceleration increases as the vehicle speed increases, so the reference vehicle speed is set smaller as the curvature increases. This improves the drivability without giving an excessive lateral acceleration to the driver.

Furthermore, the speed is reduced in an environment in which it is difficult for the driver to visually recognize the surrounding situations of the vehicle. Specifically, the speed is set low based on the information from the illuminance sensor or the external environment recognition device 325 when a dark surrounding environment is detected, or when a wiper signal or raindrops is detected by the external environment recognition device 325. The driver's fear can be suppressed by reducing the speed in a situation where it is difficult for the driver to recognize the surrounding situation.

In Step S602, the reference vehicle speed used in the automatic parking control calculation is selected. Specifically, one of the reference vehicle speed patterns that has not been subjected to a route generation process is selected, and the candidate route generation process illustrated in and after Step S603 is executed based on the reference vehicle speed. For example, in a case where a first upper limit vehicle speed set based on the road width, a second upper limit vehicle speed set based on the distance to the obstacle, a third upper limit vehicle speed set based on the curvature of the route, and a fourth upper limit vehicle speed set based on the brightness of the surrounding environment are set, the route generation process is performed using the first to fourth upper limit vehicle speeds. Therefore, Vmax of the reference vehicle speed pattern is the upper limit vehicle speed determined by the surrounding environment. Then, with the upper limit vehicle speed Vmax as a reference, the reference vehicle speed at the time of calculating the candidate route is changed as Vmax−Vd, Vmax−2×Vd, and so on.

For example, the route generation process can be performed with two reference vehicle speeds of Vmax−Vd and Vmax−2×Vd, or with three reference vehicle speeds of Vmax, Vmax−Vd, and Vmax−2×Vd.

Figure 7:
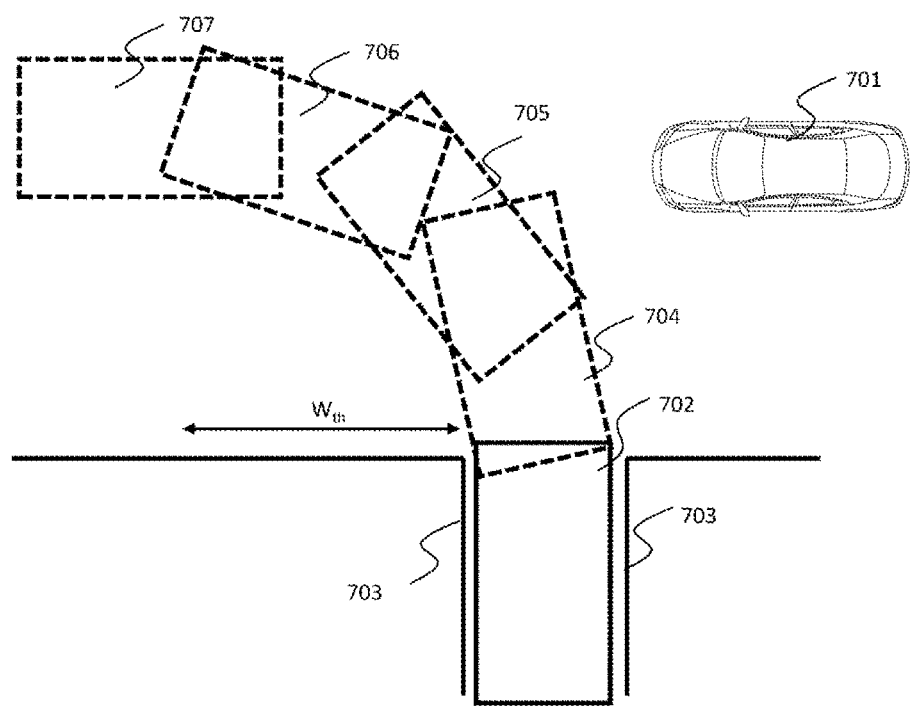
FIG. 7 is a diagram for explaining a delivery route.

In Step S603, the delivery route is calculated. FIG. 7 is a diagram for explaining a delivery route.

FIG. 7 illustrates routes 704 to 707 capable of leaving the vehicle without being brought into contact with an obstacle 703 on the left and right (such as a parked vehicle) from the state where the vehicle is accurately placed in a parking frame 702.

Here, in order to shorten the route length, it is desirable to sequentially calculate the delivery route based on a minimum turning radius at the time of turning, but the radius of the delivery route may be calculated by increasing the turning radius.

Furthermore, the radius at the time of turning may be increased as the road width in front of the parking frame 702 is wider. As a result, when the parking space is large, the vehicle turns gently and the drivability is improved.

In Step S603, the delivery route is calculated until a predetermined ending condition is satisfied. Here, the delivery route is calculated until at least one of the ending conditions such as a condition that the direction of the vehicle after leaving is perpendicular to the parking orientation of the parking frame 702, parallel to the aisle orientation, and the same direction as the direction of the vehicle at the parking start position 701, or a condition that the left vehicle arrives at a point away from the parking frame 702 by a predetermined distance Wth.

Next, the process proceeds to Step S604 to generate a connection route by one-sided steering.

Specifically, it is determined whether it is possible to connect by the one-sided steering to a delivery completion position 707 of the vehicle that has moved along the delivery route from the parking start position 701 illustrated in FIG. 7, and if the connection is possible, the route information is stored. Here, the one-sided steering is an operation (one-sided steering) of turning the steering 313 of the host vehicle to only one of the left and right sides. The connectable route information means a route that the vehicle can move from the parking start position 701 to the delivery completion position 707 by the one-sided steering without interfering with an obstacle.

Figure 8:
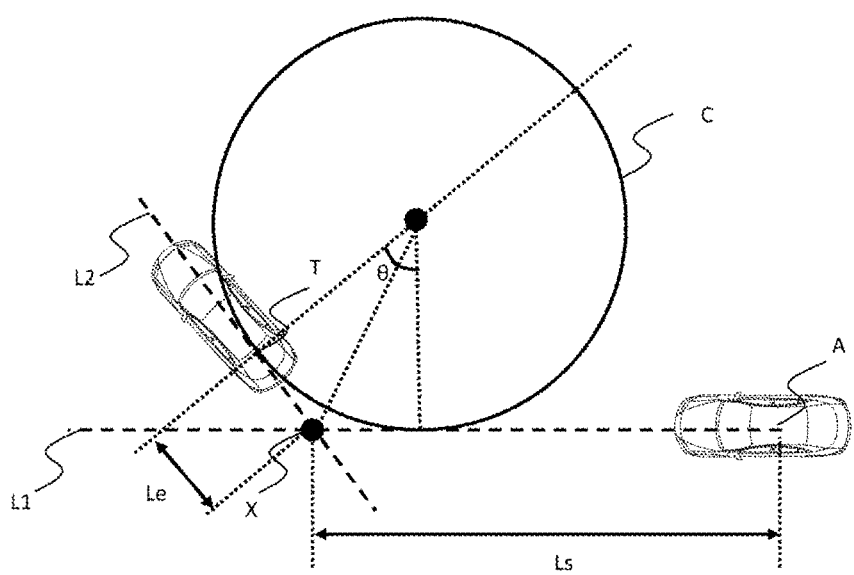
FIG. 8 is a diagram illustrating one-side steering connection.

FIG. 8 is a diagram illustrating a one-sided steering connection. As illustrated in FIG. 8, in order to generate a route from one-side steering (entry preparation route) from the parking start position A to an arrival target position T, the following calculation processes (1) to (3) are executed.

(1) An intersection X of an axis L1 of the vehicle at the parking start position A and an axis L2 of the vehicle at the arrival target position T is obtained.

(2) Then, a distance Ls between the intersection X and the parking start position A and a distance Le between the intersection X and the arrival target position T are calculated, and the shorter one is selected.

(3) in the example illustrated in FIG. 8, the distance Le is selected. Then, a circle C having two axes L1 and L2 as common tangents is drawn. A radius R of the circle C at that time is calculated by the following Expression (2).

[Math. 2]

$$R = \frac{L_e}{\tan\frac{\theta}{2}} \quad (2)$$

Here, θ is an angle formed by a contact point between the circle C and the axis L1 and a contact point between the circle C and the axis L2 in the circle C.

In this way, the straight line and the circular arc are combined to generate the route from the parking start position A to the arrival target position T. Here, the connection by the one-sided steering is not limited to a straight line and a circular arc, and a route may be generated using a relaxation curve such as clothoid.

The delivery route obtained by the calculation of the delivery route in Step S603 and the entry preparation route obtained by the generation of the connection route by the one-side steering in Step S604 are combined and stored in the memory as a first parking route.

In Step S605, a process of generating a connection route by S-shaped steering is executed. In this Step S605, it is determined whether connection is possible by the S-shaped steering from the parking start position 701 illustrated in FIG. 7 to the delivery completion position 707 calculated on the delivery route, and if connection is possible, the route information is stored.

Figure 9:
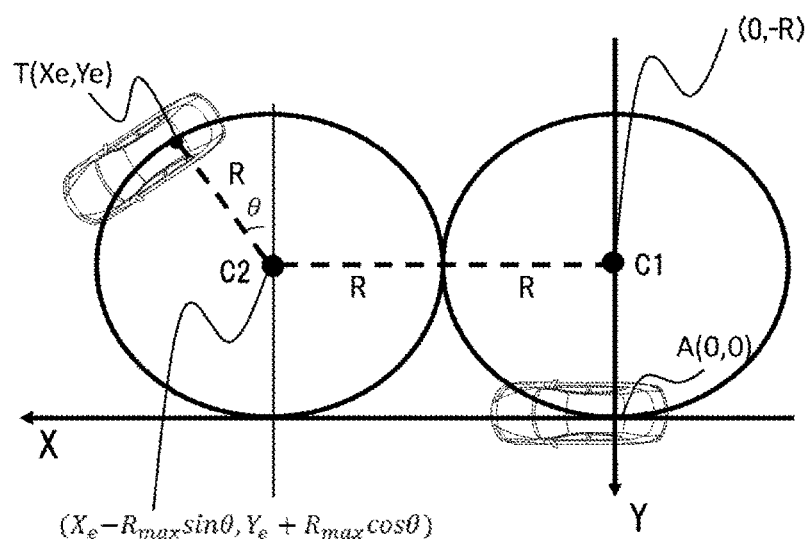
FIG. 9 is a diagram illustrating S-shaped steering connection.

FIG. 9 is a diagram illustrating an S-shaped steering connection. As illustrated in FIG. 9, in order to generate an S-shaped steering route from the parking start position A to the arrival target position T, a radius for drawing an S-shape is calculated. Here, the calculation can be facilitated by setting the turning radius of the S-shaped steering to the same radius R, but the connection route by the S-shaped steering may be generated using different radii. By setting different radii, the degree of freedom of the route by the S-shaped steering increases and it becomes easier to reach. Here, the case of the same radius R will be described. The coordinates of the parking start position A are A(0, 0), the coordinates of the reaching target position T are T(Xe, Ye), and the angle with respect to the reaching target position T, that is, the angle e indicating the direction of the vehicle at the arrival target position T when the direction of the vehicle at the parking start position A is 0. In this case, the radius R of the common circle is obtained by the center coordinates C1 and C2 of the respective circles, and therefore the following Expression (3) is established from the distance between the center coordinates. Then, R is obtained by the following Expression (4).

[Math. 3]

$$2R = \sqrt{(X_e - R\sin\theta)^2 + (Y_e + R\cos\theta + R)^2} \quad (3)$$

[Math. 4]

$$R = \frac{X_e\sin\theta - Y_e(1 + \cos\theta) - \sqrt{\{X_e\sin\theta - Y_e(1 + \cos\theta)\}^2 - 2(\cos\theta - 1)(X_e^2 + Y_e^2)}}{2(\cos\theta - 1)} \quad (4)$$

The calculated turning radius R is used to generate a connection route for the S-shaped steering. Here, the S-shaped connection is not limited to a circular arc, and a route may be generated using a smoothing curve such as clothoid.

In this way, not only the one-sided steering but also the S-shaped steering is used to generate the connection route, so that the degree of freedom is increased and the connection route is easily generated.

The delivery route obtained by the calculation of the delivery route in Step S603 and the entry preparation route obtained by the generation of the connection route by the S-shaped steering in Step S605 are combined and stored in the memory as a second parking route.

Next, the process proceeds to Step S606 to determine the end of the route generation process by starting the backward movement. In this Step S606, if the generation process by the backward movement start is not executed, the process proceeds to the route generation by the backward movement start in Step S607, and if the generation process by the backward movement start has been already executed, the process proceeds to Step S608 to determine the end of the route generation by the total reference vehicle speed pattern.

Figure 10:
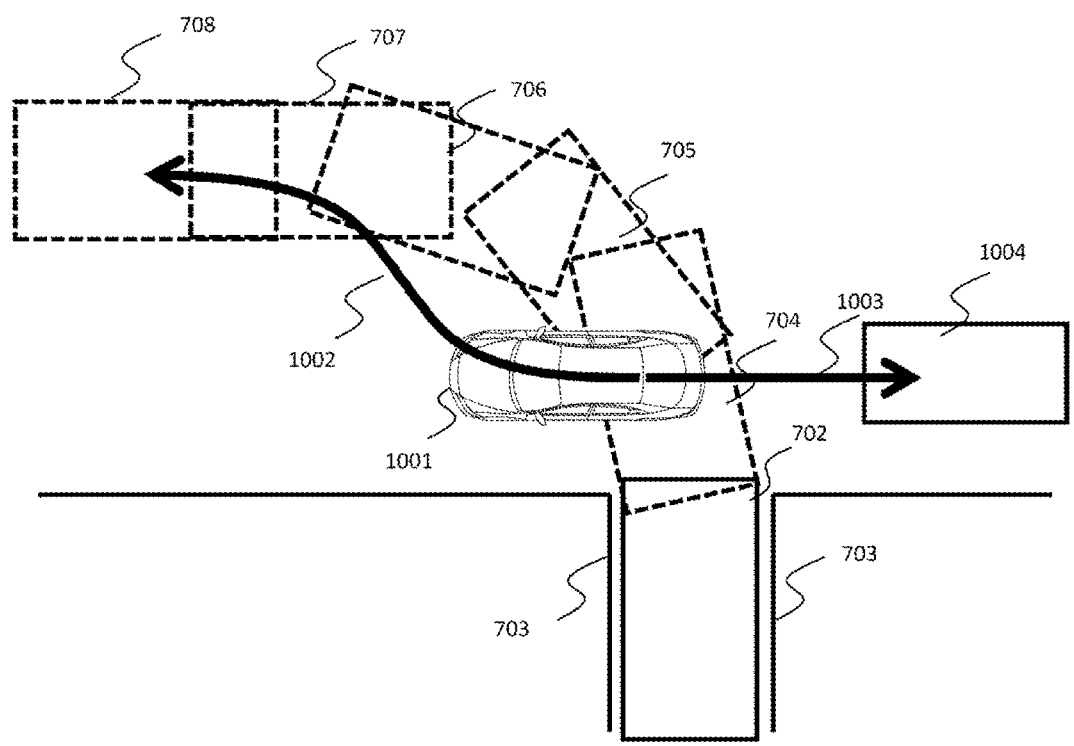
FIG. 10 is a diagram for explaining a backward route.

In Step S607, the route is generated by the backward movement start. FIG. 10 is a diagram illustrating route generation by the backward movement start. As illustrated in FIG. 10, when the own vehicle position 1001 at the start of parking passes through the parking frame, it is difficult to connect with the routes 704 to 708 capable of leaving by the one-side steering and S-shaped steering, and as indicated by the connection route 1002, the vehicle can be connected only to the route 708 capable of leaving the parking frame 702, which gives the driver a feeling of discomfort. Therefore, as illustrated by the backward route 1003, a connection route from an own vehicle position 1004 that has been retracted by a predetermined amount to the routes 704 to 708 capable of leaving the vehicle is searched. As a result, the parking route can be made compact and the driver's discomfort can be reduced.

Here, the backward position is within a predetermined value from the lateral obstacle 703, or a vehicle front position of the own vehicle is on the right side of the lateral obstacle 703. This reduces the driver's discomfort due to the backward movement.

Furthermore, when the own vehicle position 1001 at the start of parking is not parallel to the road, the vehicle angle is adjusted when moving backward so that it is parallel to the road. As a result, the next time when the vehicle moves forward, it will be easier to successfully search for a connection route to the routes 704 to 708 that can leave.

In Step S607, when the connection route by the one-sided steering in Step S604, and the connection route by the S-shaped steering in Step S605 are successfully generated after generating a backward route for retracting the vehicle from the own vehicle position 1001 at the start of parking to the own vehicle position 1004, a route obtained by combining the first parking route and the backward route including the entry preparation route by one-side steering and a route obtained by combining the second parking route and the backward route including the entry preparation route by the S-shaped steering are stored in the memory as a first candidate route and a second candidate route, respectively.

In Step S608, it is determined whether to finish the route generation based on all the reference vehicle speed patterns. In this Step S608, if the route generation for each reference vehicle speed is completed, the generation of the candidate route is ended, and if not completed, the process turns back to Step S602.

The candidate route calculation unit 501 executes the process of the flowchart illustrated in FIG. 6 as described above to generate a plurality of candidate routes. Thereby, the candidate route calculation using the entry preparation route by the one-sided steering and the entry preparation route by the S-shaped steering is performed, and it is possible to calculate an automatic parking method in which a plurality of parking patterns based on the plurality of route shapes, that is, the reference vehicle speed is the same and the route shape is different.

Figure 11:
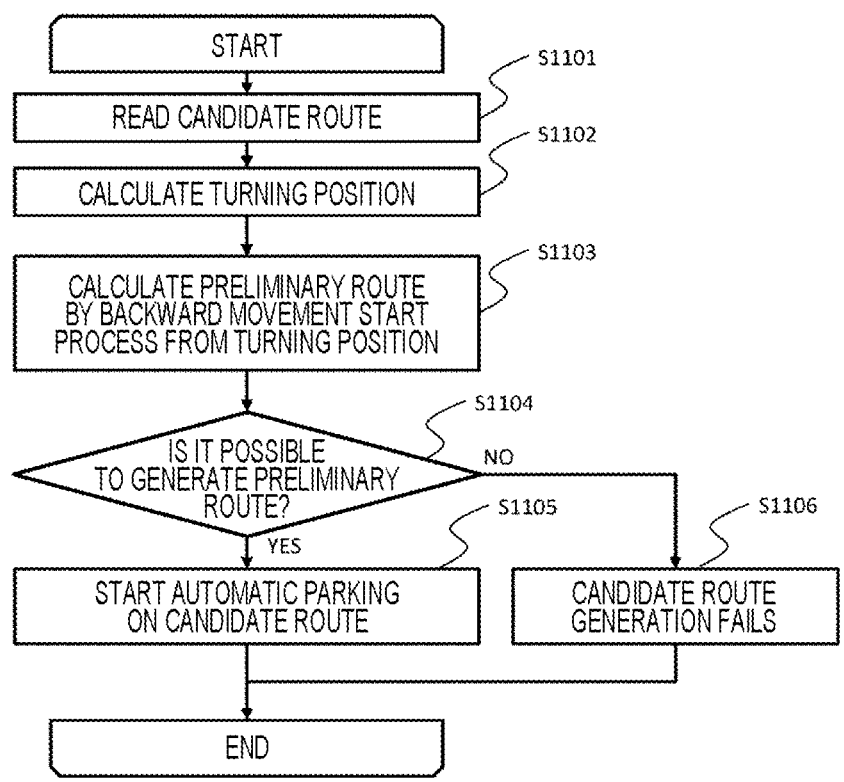
FIG. 11 is a flowchart illustrating a processing procedure of preliminary route generation.

FIG. 11 is a flowchart illustrating a processing procedure for generating a preliminary route, which is a process performed by the turning position calculation unit 502, the preliminary route calculation unit 503, and the candidate route adoption determination unit 504.

In Step S1101, the candidate routes generated by the candidate route calculation unit 501 are read. In next Step S1102, the turning position calculation unit 502 sets the turning position to a predetermined position on the parking route. The setting of the turning position will be described with reference to FIG. 12.

Figure 12:
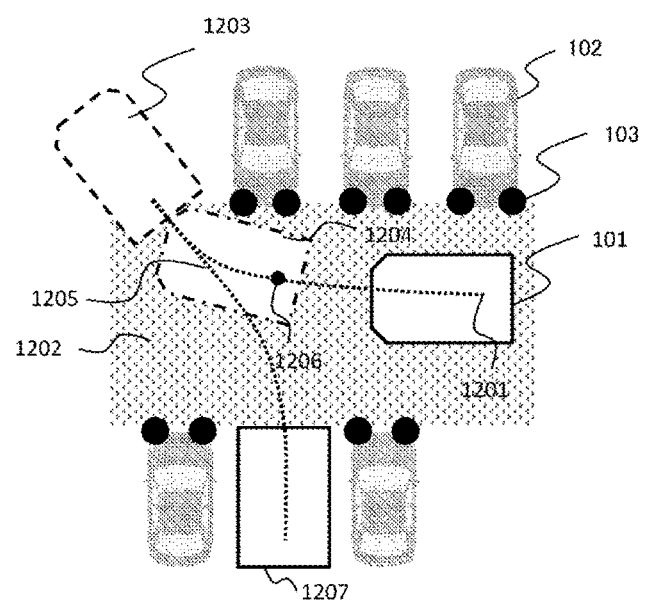
FIG. 12 is a diagram illustrating a parking route and a turning position.

FIG. 12 is a diagram illustrating a parking route and a turning position. Based on the external environment recognition device 325 installed in a vehicle 101, an area 1202 (indicated by hatching in the diagram) in which the vehicle 101 can travel is calculated at a parking start position 1201 based on position information 103 of an obstacle 102 such as a parked vehicle. Next, a parking route 1205 (dotted line) to a target parking position 1207 is calculated based on the calculated drivable area 1202. The turning position calculation unit 502 virtually moves the vehicle from the parking start position 1201 toward a turning point 1203, and calculates a turning position 1206 on the parking route 1205.

As the turning position 1206, at least one or more positions are set between the turning point 1203 of the parking route 1205 and the boundary of the area 1202, where the vehicle can drive, detected at the parking start position 1201 by the external environment recognition device 325. It is guaranteed that there is no obstacle even from the parking start position 1201 up to the drivable area 1202 detected by the external environment recognition device 325. However, this is because the vehicle may need to turn back while driving on a route exceeding the area 1202 without detecting an obstacle away from this area 1202. As an example, it is assumed that the vehicle has moved on the parking route 1205, and when a part of the vehicle is at a position 1204 outside the area 1202, the position at that time is set as the turning position 1206.

In Step S1103 of FIG. , the preliminary route calculation unit 503 calculates a preliminary route when the vehicle turns back at the turning position 1206. As a specific processing content, a backward movement start process (Step S607) similar to that illustrated in FIG. 6 is performed with the turning position 1206 as an initial position. When a route can be generated by the backward movement start process, a connection route generation by the one-side steering (Step S604) and a connection route generation by the S-shaped steering (Step S605) are performed from the retracted position, and the connection route with the delivery route is calculated, so that the route to the target parking position 1207 is calculated.

In the next Step S1104, the candidate route adoption determination unit 504 determines whether a preliminary route can be generated. In the candidate route adoption determination unit 504, when the calculated preliminary route satisfies a predetermined condition, the candidate route calculated by the candidate route calculation unit 501 is adopted as a parking route for automatic parking. If not satisfying, it is considered that the route generation has failed. Here, as an example of the case where the predetermined condition is satisfied, a preliminary route can be generated from the turning position to the target parking position. An example of a case where the predetermined condition is not satisfied is a route that the vehicle moves backward from the parking start position 1201 by the preliminary route and leaves the target parking position. This is because the driver feels uncomfortable if a route passes through a position retracted from the position instructed to start parking.

If a preliminary route can be generated in Step S1104, the process advances to Step S1105 to start automatic parking alone the initial parking route 1205. If it is not possible to generate a preliminary route in Step S1104, this parking route 1205 is not adopted and the process illustrated in FIG. 11 is repeated to read the next candidate route generated by the candidate route calculation unit 501 in Step S1101 so as to obtain a candidate route that can generate a preliminary route. With such a candidate route, even if there is an obstacle slightly ahead of the outside of the detection area of the external environment recognition device 325, it is possible to park on the preliminary route without being stuck, so smooth automatic parking is possible.

The turning position 1206 is not limited to the position 1204 where a part of the vehicle is outside the detection area of the external environment recognition device 325, and in addition, the turning position may be set to a position determined that the distance accuracy of the external environment information acquired by the external environment recognition device 325 is low. This is because if the automatic parking is started with a poor accuracy in distance to an obstacle detected based on the external environment information in the parking start position 1201, and there is an obstacle closer to the assumed position when approaching the obstacle, the parking route may not be recalculated. Therefore, if it is determined that the distance accuracy of the external environment information acquired by the external environment recognition device 325 is low, the turning position 1206 is provided. Therefore, it is possible to suppress a failure in recalculation of the parking route.

Figure 13:
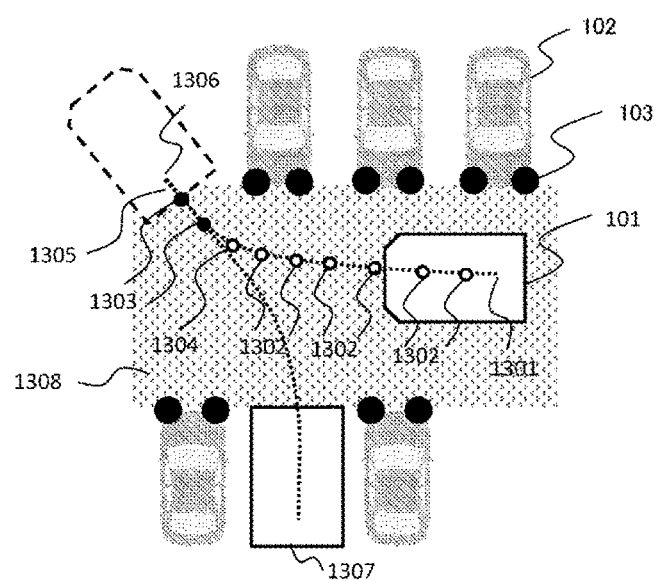
FIG. 13 is a diagram illustrating the parking route and the turning position of a modification.

FIG. 13 is a diagram illustrating a parking route and a turning position, illustrating a modification. Based on the external environment recognition device 325 installed in a vehicle 101, an area 1308 (indicated by hatching in the diagram) in which the vehicle 101 can travel is calculated at a parking start position 1301 based on position information 103 of an obstacle 102 such as a parked vehicle. Next, a parking route 1305 (dotted line) to a target parking position 1307 is calculated based on the calculated drivable area 1308. The final turning point 1306 of the vehicle on the parking route 1305 is at the position illustrated in FIG. 13. The turning position calculation unit 502 provides turning positions 1302, 1303, and 1304 on the parking route 1305 from the parking start position 1301 to the turning point 1306 at predetermined intervals, and when the vehicle turns at each of the turning positions 1302, 1303, and 1304, it is calculated whether a preliminary route to the target parking position 1307 can be generated. By turning, it is determined whether each position is the position 1302 (white circle) or 1304 (white circle) where the preliminary route can be generated and the position 1303 (black circle) where the preliminary route cannot be generated, and the position 1304 which is closest to the turning point 1306 and can generate the preliminary route is set as the turning position. Accordingly, in the parking route 1305, the reliability of the automatic parking can be improved by previously grasping the position where the preliminary route due to the turning back cannot be generated.

In addition, when passing the vicinity of the turning position 1303 where the preliminary route cannot be generated, or the position deeper than the turning position 1304, the vehicle 101 may suppress the speed of the vehicle 101 from being lowered compared to a case where the vehicle passes the position before the turning position 1304. When the vehicle speed of the vehicle 101 is high, the vehicle passes through the turning positions 1302 and 1304 at a high speed, so when the external environment recognition device 325 detects a new obstacle, the braking distance increases and the vehicle 101 advances to the turning position 1303 where a route cannot be generated. Thus, there is also the possibility of stopping.

Therefore, when driving near the turning position 1304 where there is a possibility that the preliminary route cannot be generated and at the back of the turning position 1304, the speed is lowered compared to a time when driving at the front turning position 1302. As a result, the braking distance is shortened, the vehicle can be stopped before reaching a point where a route cannot be generated, and the reliability of automatic parking is improved.

Second Embodiment

Hereinafter, a second embodiment of the invention will be described with reference to FIGS. 14 to 16. The diagram illustrating the configuration of the vehicle equipped with the parking assistance device of FIG. 3 and the block diagram illustrating the configuration of the vehicle control device of FIG. 4 described in the first embodiment are the same in the second embodiment. The second embodiment is different in the configuration of the route generation unit 403 illustrated in the first embodiment.

Figure 14:
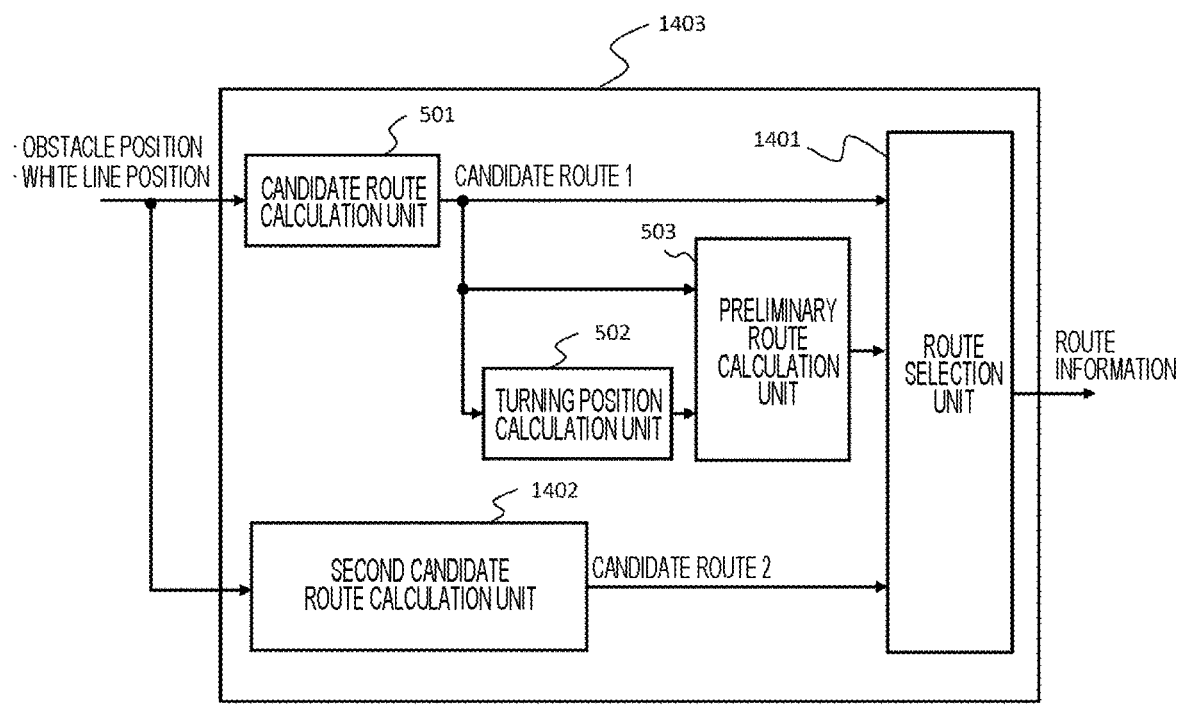
FIG. 14 is a block diagram illustrating a configuration of a route generation unit in a second embodiment.

FIG. 14 is a block diagram illustrating the configuration of the route generation unit 1403 in the second embodiment. As illustrated in FIG. 14, a route generation unit 1403 includes a candidate route calculation unit 501, a turning position calculation unit 502, a preliminary route calculation unit 503, a route selection unit 1401, and a second candidate route calculation unit 1402.

For the candidate route output by the candidate route calculation unit 501, as described in the first embodiment, the preliminary route calculation unit 503 calculates the preliminary route based on the turning position calculated by the turning position calculation unit 502.

Figure 15:
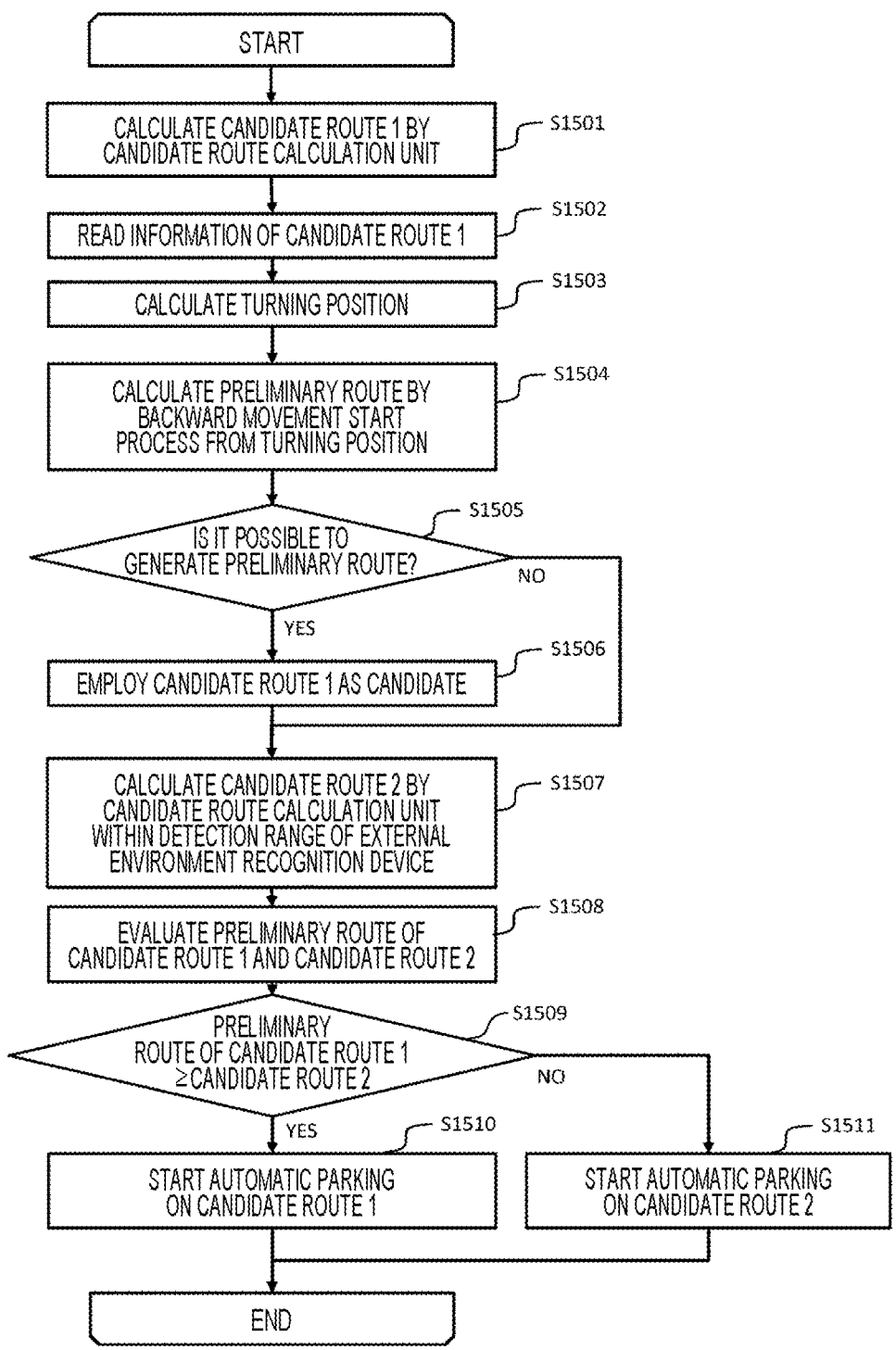
FIG. 15 is a flowchart illustrating a processing procedure of a preliminary route generation in the second embodiment.
Figure 16:
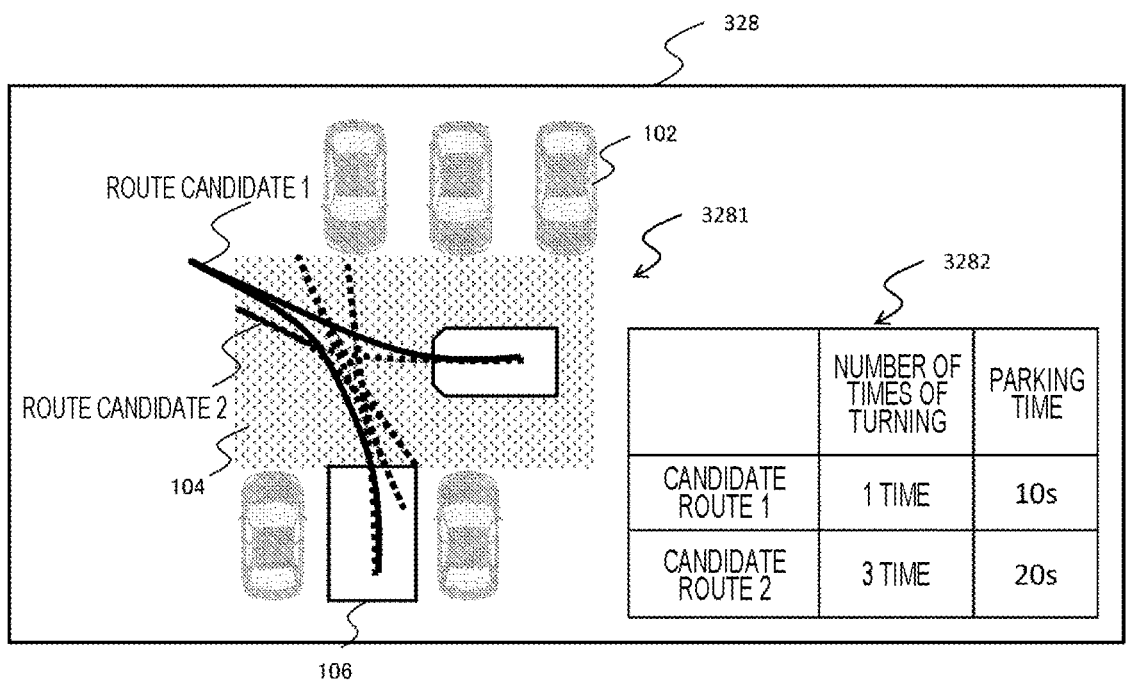
FIG. 16 is a diagram illustrating a display example of an input/output device in the second embodiment.

FIG. 15 is a flowchart illustrating a processing procedure for generating a preliminary route, which is processed by the candidate route calculation unit 501, the turning position calculation unit 502, the preliminary route calculation unit 503, the route selection unit 1401, and the second candidate route calculation unit 1402.

In Step S1501, the candidate route calculation unit 501 calculates a candidate route by making maximum use of the empty space, and sets this as the candidate route 1. The calculation of the candidate route by the candidate route calculation unit 501 is the same as in the first embodiment.

Next, in Step S1502, the generated candidate route 1 is read. Then, in Step S1503, turning position calculation unit 502 sets the turning position at a predetermined position on the parking route. Next, in Step S1504, the preliminary route calculation unit 503 calculates a preliminary route when the vehicle turns back at the turning position. The processes of Steps S1502 to S1504 are the same as the processes of Steps S1101 to S1103 described in the first embodiment, and thus details thereof will be omitted.

In the next Step S1505, it is determined whether a preliminary route can be generated. If the calculated preliminary route satisfies a predetermined condition, the preliminary route calculation unit 503 adopts the calculated candidate route 1 as the parking route for automatic parking in Step S1506, and if not satisfying, the candidate route 1 is not adopted, and the process proceeds to Step S1507. Here, as an example of the case where the predetermined condition is satisfied, a preliminary route can be generated from the turning position to the target parking position. An example of a case where the predetermined condition is not satisfied is a route that the vehicle moves backward from the parking start position by the preliminary route and leaves the target parking position.

In Step S1507, the second candidate route calculation unit 1402 calculates the candidate route as the drivable area of the vehicle within the area corresponding to the acquisition range of the external environment information of the external environment recognition device 325, and sets this as a candidate route 2. Specifically, the second candidate route calculation unit 1402 generates, for example, the parking route 105 with the area where the external environment recognition device 325 can acquire the external environment information and the area without obstacles as the drivable area 104 as illustrated in FIG. 1, and output this as the candidate route 2. As a result, the candidate route 2 calculated by the second candidate route calculation unit 1402 is adopted to perform the automatic parking rather than adopting the candidate route 1 for which the preliminary route cannot be generated even if the candidate route 1 is calculated by utilizing the most of the free space. Thus, it is possible to execute the automatic parking more reliably.

Next, in Step S1508, the route selection unit 1401 performs route evaluation to evaluate which preliminary route of candidate route 1 and the candidate route 2 is superior or inferior. The route evaluation is calculated based on at least one index of the number of times of turning, a route length, and a parking time.

Here, the parking time is calculated by adding a route passing time based on the calculated length of the route and the speed at which the vehicle passes the route, and a state switching time required to change the steering angle to a predetermined value by performing the forward and backward switching of the vehicle or the steering (hereinafter, steering without driving) with the vehicle stopped. The smaller the number of times of turning and the shorter the parking time or the shorter the route length, the higher the route evaluation. The more the number of times of turning and the longer the parking time or the longer the route length, the lower the route evaluation. Further, in the route evaluation, the weighting of the index may be set in consideration of the driver's preference. Specifically, the driver may operate an input device 328 to set a priority index in advance.

In Step S1509, the route selection unit 1401 determines whether the preliminary route of the candidate route 1 is higher than or equal to the route evaluation of the candidate route 2, and if higher or equal, the process proceeds to Step S1510, and if not higher, the process proceeds to Step S1511. In Step S1510, the automatic parking is started on the preliminary route of the candidate route 1, and the automatic parking is started on the candidate route 2 in Step S1511. This is because even if the candidate route 1 has a higher route evaluation than the candidate route 2, if the preliminary route of the candidate route 1 has a lower evaluation than the candidate route 2, the candidate route 2 is more likely to smoothly perform the automatic parking. This can prevent the smooth automatic parking from being disturbed.

Another example of the route evaluation will be described with reference to FIG. 16. FIG. 16 is a diagram illustrating a display example of the input/output device 328. As illustrated in FIG. 16, the input/output device 328 has a route display area 3281 for displaying a candidate route and a data display area 3282 for displaying data of the candidate route.

Based on the external environment recognition device 325, the obstacle 102 such as a parked vehicle, the area 104 in which the vehicle 101 can drive (indicated by hatching in the diagram), and a preliminary route of the candidate route 1 to the target parking position 106 and the candidate route 2 are displayed in the route display area 3281. In the data display area 3282, the number of times of turning and parking time of each candidate route are displayed. At this time, when the evaluation of the preliminary route is lower than the evaluation of the candidate route 2, the candidate route 1 may not be displayed and only the candidate route 2 may be displayed. As a result, the candidate route 1 is selected, and the vehicle is actually turned back. Therefore, when the number of times of turning is increased, it is possible to prevent the driver from feeling distrust of the automatic parking. The driver selects a desired candidate route from the displayed information. The vehicle starts the automatic parking on the selected candidate route.

By realizing the above route generation, even if there is an empty space, if there is a possibility that the route evaluation will be lower than the conventional route, the reliability of the automatic parking can be improved by selecting a route that does not use the empty space.

Third Embodiment

Hereinafter, a third embodiment of the invention will be described with reference to FIGS. 17 to 20. The diagram illustrating the configuration of the vehicle equipped with the parking assistance device of FIG. 3 described in the first embodiment are the same in the second embodiment. The second embodiment is different in the configuration of the vehicle control device 324 illustrated in the first embodiment.

Figure 17:
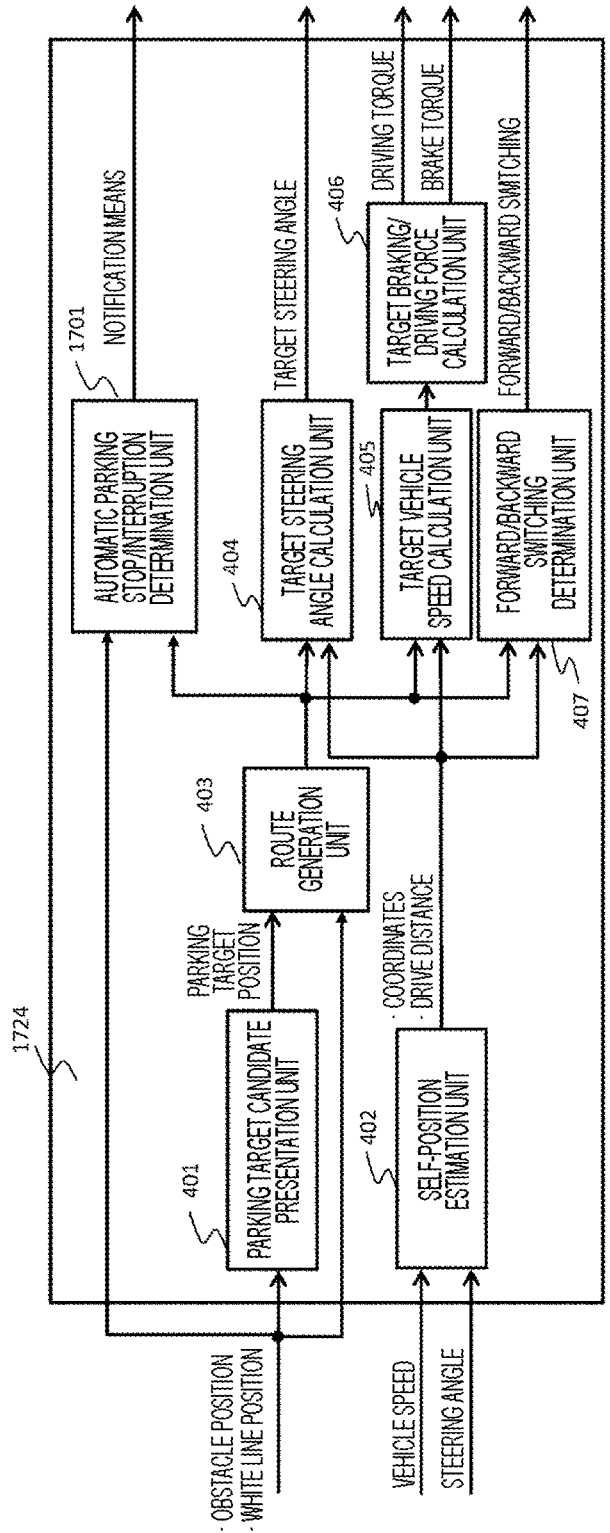
FIG. 17 is a block diagram illustrating a configuration of a vehicle control device in a third embodiment.

FIG. 17 is a block diagram illustrating a configuration of a vehicle control device 1724 in this embodiment. The same parts as those of the vehicle control device 324 illustrated in the first embodiment are designated by the same reference numerals, the description thereof will be omitted, and different parts will be described.

The vehicle control device 1724 includes an automatic parking stop/interruption determination unit 1701 in addition to the configuration of the vehicle control device 324 in the first embodiment.

The automatic parking stop/interruption determination unit 1701 stops or interrupts the automatic parking when the distance of an obstacle or the target parking position recognized at the parking start position and the distance actually recognized after starting the automatic parking are different and the automatic parking is hard to continue. Here, stopping indicates that the automatic parking is stopped and the control is transferred to the driver, and interruption indicates that the automatic parking process is temporarily stopped and is restarted when there is a restart request (for example, pressing a restart button, switching the shift, etc.) from the driver or there is no obstacle on the route in the advancing direction.

Figure 18:
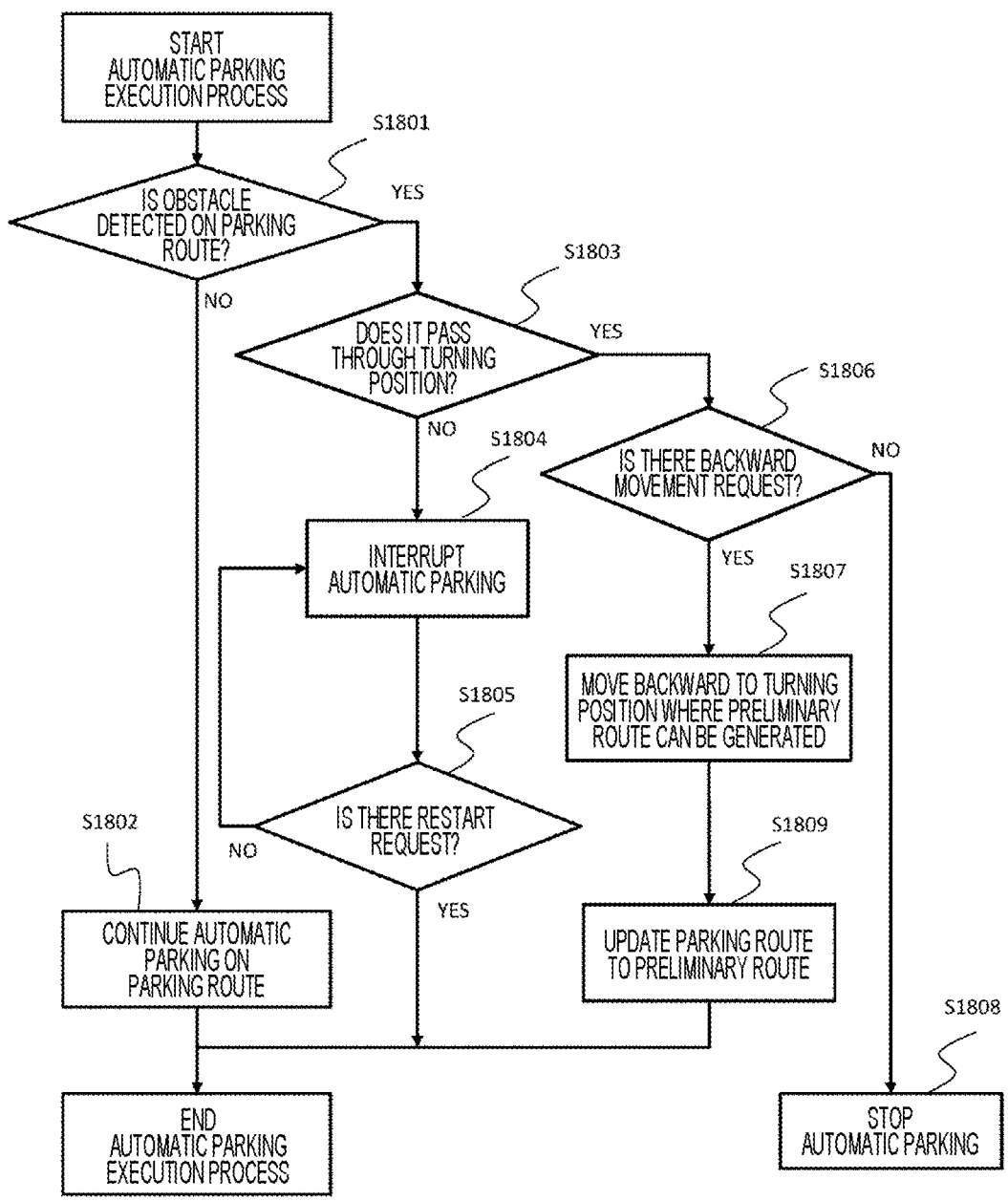
FIG. 18 is a flowchart illustrating a processing procedure of an automatic parking stop/interruption determination unit in the third embodiment.

FIG. 18 is a flowchart illustrating a processing procedure of the automatic parking stop/interruption determination unit 1701. In Step S1801, it is determined whether there is an obstacle on the parking route. If it is determined that there is no obstacle, the process proceeds to Step S1802 to continue automatic parking on the parking route. On the other hand, if it is determined that there is an obstacle, the process proceeds to Step S1803.

Figure 19:
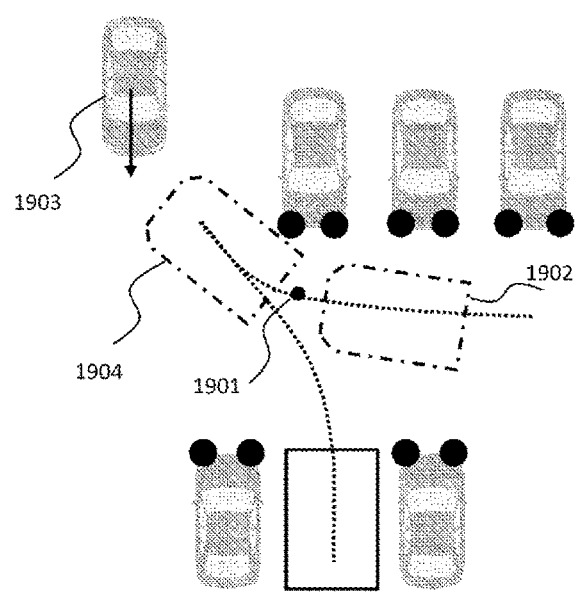
FIG. 19 is a diagram illustrating a parking route in the automatic parking stop/interruption determination unit in the third embodiment.
Figure 20:
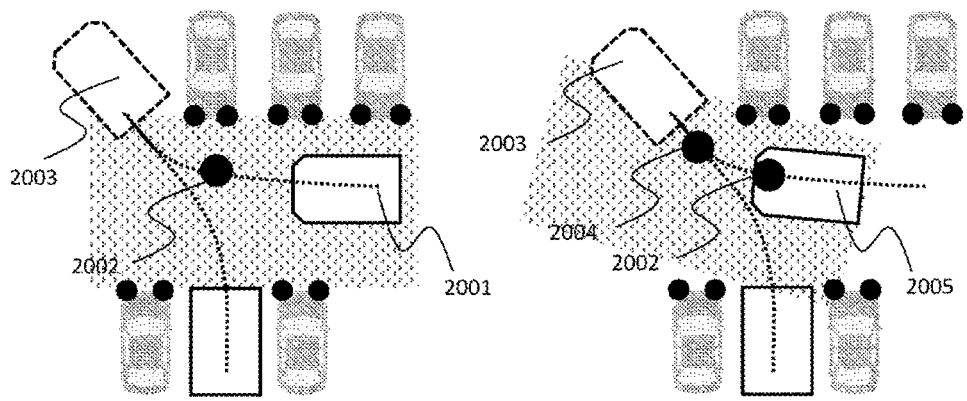
FIG. 20 is a diagram illustrating a parking route in a modification.

In Step S1803, when an obstacle is detected, it is determined whether the vehicle is passing through the turning position. Specifically, as illustrated in FIG. 19, when an obstacle 1903 is detected, if the own vehicle position is a position 1902 before a turning position 1901, it is determined that the vehicle has not passed, the process proceeds to Step S1804, and the automatic parking is interrupted. Here, when the own vehicle position is before the turning position 1901, it can be more likely to generate a parking route on the preliminary route by interrupting the automatic parking without approaching the obstacle until the collision to the obstacle is determined.

In the next Step S1805, if it is determined that there is a restart request from the driver or that there is no obstacle left, the automatic parking is restarted according to the parking route.

On the other hand, in Step S1803, if it is at a position 1904 deeper than the turning position 1901, it is determined that the turning position 1901 has passed, and the process proceeds to Step S1806.

In Step S1806, when the driver requests a backward movement, the process proceeds to Step S1807, and the vehicle moves backward to a turning position where a preliminary route can be generated. If the driver does not request the backward movement, the process advances to Step S1808 to stop the automatic parking and transfer the control to the driver.

In Step S1809, the vehicle is moved backward to the turning position and the parking route is updated to the preliminary route, thereby restarting the automatic parking using the preliminary route. As a result, even if the obstacle 1903 appears, the automatic parking can be continued as long as possible, and the reliability of the automatic parking is improved.

The vehicle control devices 324 and 1724 according to the first to third embodiments have been described by way of an example in which the automatic parking is started by obtaining the turning position at the parking start position. However, the invention is not limited to this, and the automatic parking may be started and the turning position may be sequentially obtained while the vehicle is moving. Specifically, as illustrated in FIG. 20(a), at the parking start position 2001, a turning position 2002 at which a preliminary route can be generated is calculated. Then, the drivable area is sequentially updated as the vehicle moves on the parking route. Then, based on the updated drivable area, as illustrated in FIG. 20(b), a turning position 2004 is updated, and at the same time a preliminary route that can be generated is also calculated. If a preliminary route can be generated, the automatic parking is continued, and if the position where a preliminary route cannot be generated can be detected in advance, the route is switched to the preliminary route before reaching the position, and if the preliminary route cannot be detected, the automatic parking is stopped. As a result, when the vehicle moves to a position 2005 illustrated in FIG. 20(b), it finally moves to the turning position 2002 where a preliminary route can be generated. This improves the reliability of the automatic parking. Further, if such process is used for the stop/interruption determination of the automatic parking described in the third embodiment, it is possible to detect the position where a preliminary route cannot be generated in advance during driving. Therefore, the situation where the automatic parking is stopped can be reduced as much as possible, and the reliability of the automatic parking is improved.

According to the above embodiment, the following operational effects are obtained.

(1) The parking assistance device includes the candidate route calculation unit 501 which generates a candidate route from the current position of the vehicle to the target parking position based on the drivable area of the vehicle recognized based on the external environment information in the external environment recognition device 325, the turning position calculation unit 502 which provides a turning position at a predetermined position on the candidate route generated by the candidate route calculation unit 501, and the preliminary route calculation unit 503 which generates a preliminary route from the turning position to the target parking position. The candidate route in which the preliminary route can be generated by the preliminary route calculation unit 503 is set to a parking route of the automatic parking. This enables smooth automatic parking.

The invention is not limited to the above embodiments, and includes other forms considered within the scope of the technical ideas of the invention as long as the features of the invention are not degraded. In addition, the above embodiments and the modifications may be combined.

REFERENCE SIGNS LIST 101 vehicle
102 obstacle
103 obstacle position information
104 drivable area
105 parking route
106 target parking position
310 driving force generation mechanism
311 brake
312 transmission
313 steering
314 wheel
320 driving force control device
321 brake control device
322 steering control mechanism
323 transmission control device
324 vehicle control device
325 external environment recognition device
326 vehicle speed sensor
401 parking target candidate presentation unit
402 self-position estimation unit
403 route generation unit
404 target steering angle calculation unit
405 target vehicle speed calculation unit
406 target braking/driving force calculation unit
407 forward/backward switching determination unit
501 candidate route calculation unit
502 turning position calculation unit
503 preliminary route calculation unit
504 candidate route adoption determination unit
1401 route selection unit
1402 second candidate route calculation unit
1701 automatic parking stop/interruption determination unit

The invention claimed is:

1. A parking assistance device, comprising:
at least one processor configured to:
generate a candidate route from a current position of a vehicle to a target parking position based on a drivable area of the vehicle that is recognized based on external environment information;
provide a turning position at a predetermined position on the candidate route generated by the at least one processor;
generate a preliminary route from the turning position to the target parking position;
set the candidate route in which the preliminary route can be generated by the at least one processor to a parking route of automatic parking;
determine whether to stop the automatic parking; and
when an obstacle is detected while the vehicle is driving on the parking route, stop the automatic parking when the vehicle passes through the turning position and there is no backward request from a driver,
wherein, when an obstacle is detected while the vehicle is driving on the parking route, the vehicle moves backward to the turning position and continues the automatic parking by the preliminary route when the vehicle passes through the turning position and there is a backward request from a driver.

2. The parking assistance device according to claim 1, wherein the at least one processor is configured to provide at least one or more turning positions on the candidate route to a boundary of the area where the vehicle can drive.

3. The parking assistance device according to claim 1, wherein the at least one processor is configured to provide at least one or more turning positions on the candidate route to a position where a distance accuracy of the external environment information is determined to be low.

4. The parking assistance device according to claim 1, wherein the at least one processor is located at a position near a final turning point of the vehicle on the candidate route, and the turning position is provided at a position where the preliminary route can be generated.

5. The parking assistance device according to claim 1, wherein
the at least one processor is configured to determine whether to temporarily interrupt the automatic parking, wherein, when an obstacle is detected while the vehicle is driving on the parking route, the at least one processor is configured to temporarily interrupt the automatic parking when the vehicle does not pass through the turning position.

6. The parking assistance device according to claim 1, wherein the at least one processor is configured to sequentially calculate the preliminary route while the vehicle is driving by the automatic parking.

7. The parking assistance device according to claim 1, wherein, when the vehicle passes through a position near the turning position where the preliminary route cannot be generated or a position deeper than the turning position, the at least one processor is configured to lower a speed of the vehicle as compared to a time when the vehicle passes through a position in front of the turning position.

8. A parking assistance device, comprising:
at least one processor configured to:
generate a candidate route from a current position of a vehicle to a target parking position based on a drivable area of the vehicle that is recognized based on external environment information;
provide a turning position at a predetermined position on the candidate route generated by the at least one processor;
generate a preliminary route from the turning position to the target parking position;
set the candidate route in which the preliminary route can be generated by the at least one processor to a parking route of automatic parking;
generate a second candidate route from the current position of the vehicle to the target parking position within an area based on an acquisition range of the external environment information;
set the second candidate route to a parking route of the automatic parking when the preliminary route cannot be generated by the at least one processor;
perform route evaluation to evaluate which one of the preliminary route and the second candidate route is superior or inferior,
set the preliminary route or the second candidate route to a parking route of the automatic parking based on the route evaluation of the route selection unit;
perform the route evaluation using at least one or more indexes among the number of times of turning, a parking time, and a route length; and
arbitrarily set a weight of the index of the route evaluation.

9. The parking assistance device according to claim 8, comprising:
a display device configured to display the preliminary route and the second candidate route,
wherein the preliminary route or the second candidate route selected by a selection request from a driver with respect to the preliminary route and the second candidate route displayed in the display device is set to a parking route of the automatic parking.

10. The parking assistance device according to claim 8, comprising:
a display device configured to display the preliminary route or the second candidate route based on the route evaluation of the at least one processor.

* * * * *